June 25, 1963   M. WOYTOWICH   3,095,058
MOTORCYCLE ORNAMENT AND SPLASH GUARD
Filed Nov. 30, 1961

Michael Woytowich
INVENTOR.

BY *Clarence A. O'Brien*
*and Harvey B. Jacobson*
Attorneys

United States Patent Office 3,095,058
Patented June 25, 1963

3,095,058
MOTORCYCLE ORNAMENT AND SPLASH GUARD
Michael Woytowich, 78 Rutgers, Belleville, N.J.
Filed Nov. 30, 1961, Ser. No. 156,079
7 Claims. (Cl. 180—29)

This invention relates to a novel and useful motorcycle ornament and extension for the dual exhaust pipes of a motorcycle extending along opposite sides of the rear of a motorcycle and terminating at the rear ends alongside the rear wheel of the motorcycle.

The motorcycle ornament and extension of the instant invention is not only designed for providing an accessory for a motorcycle which will enhance the appearance of the motorcycle, but also as a reinforcement for the rear end of the dual exhaust pipes of a motorcycle extending along opposite sides of the rear of the motorcycle and also as a splash guard adapted to deflect water which may be spun from the outer periphery of the rear wheel of a motorcycle while the latter is travelling over a wet road surface.

In addition, the motorcycle ornament and extension of the instant invention is provided with upwardly and outwardly curving opposite side fins which in addition to adding to the appearance of the ornament and extension also comprise splash guards for water splashed out from opposite sides of the point of contact of the rear wheel of a motorcycle with a wet supporting surface.

The main object of this invention is to provide a motorcycle ornament and extension for the dual exhaust pipes of a motorcycle which will enhance the appearance of the motorcycle.

A further object of this invention, in accordance with the immediately preceding object, is to provide a motorcycle ornament and extension which will provide rigid bracing between the rear ends of the dual exhaust pipes of a motorcycle.

A still further object of this invention is to provide an ornament and an extension which will define a splash plate disposed immediately rearwardly of a motorcycle wheel in order to prevent water which is spun from the outer periphery of the rear wheel of a motorcycle from being thrown upwardly.

Still another object of this invention is to provide a motorcycle ornament and extension which will comprise a splash guard for water splashed out from opposite sides of the point of contact of the rear wheel of a motorcycle travelling over a wet supporting surface.

An final object to be specifically enumerated herein is to provide a motorcycle ornament and extension in accordance with the preceding objects which will conform to conventional forms of manufacture, be of simple construction and easy to install so as to provide a device that will be economically feasible, long lasting and relatively trouble free in installation procedures.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1:
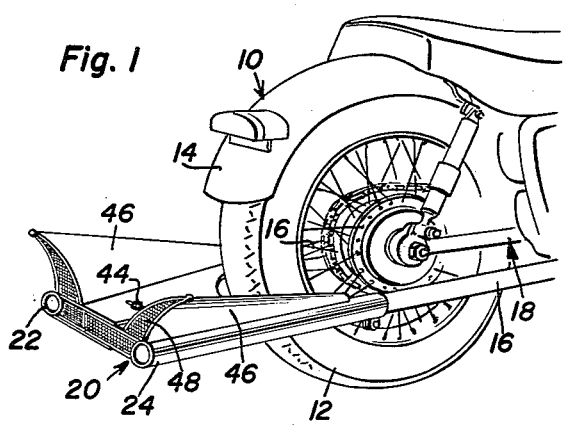
FIGURE 1 is a perspective view of the ornament and extension of the instant invention shown mounted upon the rear ends of the dual exhaust pipes of a motorcycle with the center portion of the extension disposed immediately rearwardly of the rear wheel of the motorcycle.
Figure 6:
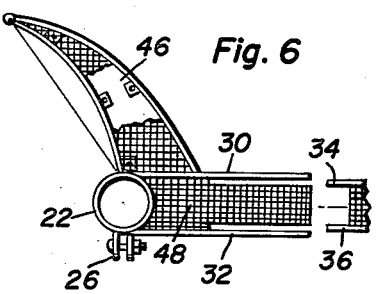
FIGURE 6 is a fragmentary exploded rear end elevational view of the motorcycle ornament and extension.

Referring now more specifically to the drawings in FIGURE 1 there may be seen a motorcycle generally referred to by the reference numeral 10 which includes a rear wheel 12, a fender 14 which extends over the rear wheel, a pair of exhaust pipes 16 and a sprung rear fork generally referred to by the reference numeral 18 which rotatably supports the rear wheel 12.

It will be noted that the exhaust pipes 16 extend along opposite sides of the motorcycle 10 and that they terminate at their rear ends alongside the rear wheel 12 of the motorcycle.

The ornament of the instant invention is generally designated by the reference numeral 20 and includes a pair of pipe members 22 and 24 which each includes a split clamp assembly 26 at their forward end for clamping engagement with the corresponding exhaust pipe 16. Extendable brace means generally referred to by the reference numeral 28 is provided and is utilized to mount the pipe members 22 and 24 in varied spatial relationship. The brace means 28 includes a pair of generally parallel and laterally projecting mounting plates 30 and 32 which are secured to the pipe member 22 and a pair of laterally projecting and generally parallel mounting plates 34 and 36 which are secured to the pipe member 24. The free end edges of the plates 30 and 34 are overlapped as are the free end edges of the plates 32 and 36. The plates 30, 32, 34 and 36 each have a pair of slots 40 formed therein which extend transversely of the corresponding pipe member and it will be noted that the slots in each pair of plates 30 and 32 and 34 and 36 are registered and that the slots formed in the plates 30 and 32 may be registered with the slots formed in the plates 34 and 36. A pair of sleeve spacers 42 are disposed between the plates 34 and 36 and are aligned with the corresponding aligned slots 40. A pair of fasteners 44 are secured through the corresponding slots 40 and the sleeve spacers 42 and in this manner the pipe members 22 and 24 are rigidly secured together. However, it will be noted that because of the slots 40 and the fasteners 44 the pipe members 22 and 24 may be adjusted toward and away from each other. In addition, the pipes 22 and 24 may also be adjusted to be either rearwardly or forwardly convergent as desired in order to conform to the rear ends of the exhaust pipes 16.

Figure 2:
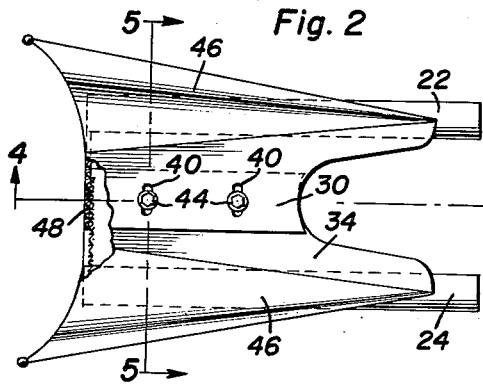
FIGURE 2 is a top plan view of the ornament and extension.
Figure 3:
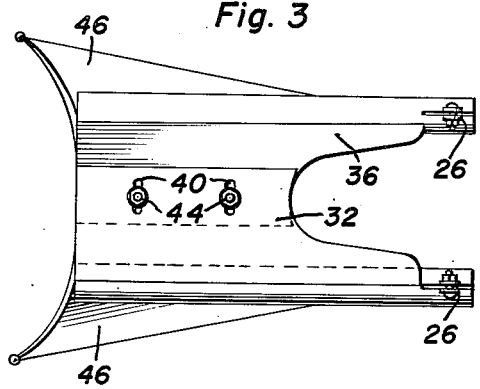
FIGURE 3 is a bottom plan view of the extension.
Figure 4:
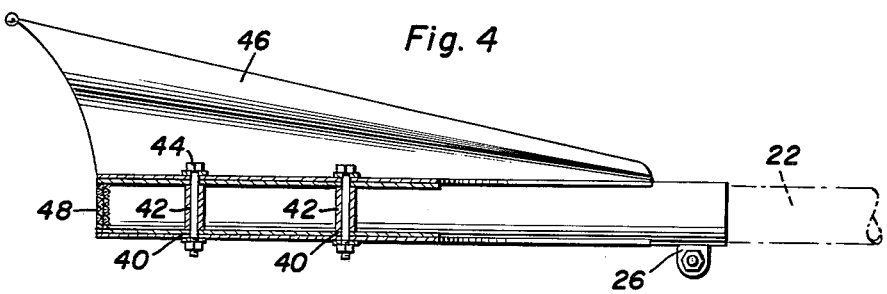
FIGURE 4 is an enlarged vertical sectional view taken substantially upon the plane indicated by the section line 4—4 of FIGURE 2.
Figure 5:
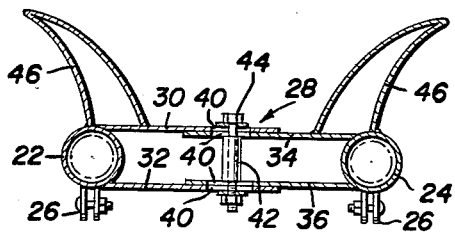
FIGURE 5 is an enlarged transverse vertical sectional view taken substantially upon the plane indicated by the section line 5—5 of FIGURE 2.

From FIGURES 2 and 3 of the drawings it will be noted that the plates 30, 32, 34 and 36 form a forwardly opening generally U-shaped notch for embracing the rear portion of the wheel 12. In addition, the plates 32 and 36 define a splash guard or deflector for water which may be spun from the outer periphery of the rear wheel 12. Additionally, it will be noted that the mounting plates 30, 32, 34 and 36 provide rigid bracing between the pipe members 22 and 24. With attention now directed to FIGURES 1 and 5 of the drawings in particular it may be seen that each of the pipe members 22 and 24 includes an upwardly and outwardly curving fin 46 and that each of the fins 46 is inclined rearwardly and upwardly and is tapered to a minor end portion at its forward end. The upwardly and outwardly curving fins 46 serve to define splash guards for water splashed out from opposite sides of the point of contact of the rear wheel 12 with a wet supporting surface as the motorcycle 10 moves thereover.

As the area defined between the plates 30, 32, 34 and 36 opens at its rear end and the rear ends of the fins 46 are also open, a grillwork 48 formed of any suitable material is secured over the open rear end of the attachment 20.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A motorcycle ornament and extension for dual exhaust pipes extending along opposite sides of the rear of a motorcycle and terminating at their rear ends alongside the rear wheel of the motorcycle, said ornament and extension comprising a pair of pipe members each including a longitudinally extending and laterally directed mounting plate, said plates disposed in parallel free end overlapping relation and secured together to define a brace extending between said pipe members and a splash guard adapted to pass a spaced distance behind the rear wheel, and means carried by the forward ends of said pipe members adapting the latter for communicating engagement with said exhaust pipes.

2. The combination of claim 1 wherein said mounting plates include means for securing said plates together for adjustable positioning of said pipe members toward and away from each other.

3. The combination of claim 1 wherein said mounting plates also include means for securing said plates together for adjustable positioning of corresponding ends of said pipe members toward and away from each other whereby said pipe members may be adjusted to be either rearwardly or forwardly convergent.

4. The combination of claim 1 wherein each of said pipe members includes a pair of said mounting plates which generally parallel each other, the free ends of corresponding pairs of said plates being overlapped at their free ends and secured together.

5. The combination of claim 1 wherein said pipe members each include an upwardly and outwardly curving fin comprising splash guards for water splashed out from opposite sides of the point of contact of the rear wheel with its supporting surface.

6. In combination with a motorcycle having a rear wheel and dual exhaust pipes extending along opposite sides of said rear wheel and terminating at their rear ends alongside the rear wheel of the motorcycle, an ornament and extension comprising a pair of pipe members including means at their forward ends removably securing said pipe members to the rear ends of said exhaust pipes in communicating engagement therewith, and brace means secured between the rear ends of said pipe members and passing behind the rear wheel of said motorcycle, said brace means defining splash guard means for deflecting water which may be spun from the outer periphery of said rear wheel.

7. The combination of claim 6 wherein said brace means includes a pair of laterally projecting upper and lower parallel plates secured to each of said pipe members, the free edges of corresponding plates of said pairs of plates being disposed in overlapping relation and having a pair of aligned slots formed therein extending transversely of said pipe members, apertured spacer members disposed between the adjacent upper and lower plates and aligned with the corresponding slots, and a pair of fasteners secured through said slots and spacer members.

References Cited in the file of this patent

FOREIGN PATENTS

| | | |
|---|---|---|
| 187,171 | Great Britain | Oct. 19, 1922 |
| 531,478 | Italy | Aug. 2, 1955 |
| 702,098 | Germany | Jan. 2, 1941 |
| 1,139,971 | France | Feb. 25, 1957 |